(12) United States Patent
Steele et al.

(10) Patent No.: US 7,140,868 B1
(45) Date of Patent: Nov. 28, 2006

(54) UNIVERSAL LIFTER FOOT ASSEMBLY FOR REMOVAL OF CORE BLOCK FROM MOLD

(75) Inventors: Harold W. Steele, Marne, MI (US);
Phillip A. Tanis, Hudsonville, MI (US)

(73) Assignee: HS Die & Engineering, Inc., Grand Rapids, MI (US)

( * ) Notice: Subject to any disclaimer, the term of this patent is extended or adjusted under 35 U.S.C. 154(b) by 198 days.

(21) Appl. No.: 10/708,770

(22) Filed: Mar. 24, 2004

Related U.S. Application Data

(60) Provisional application No. 60/481,567, filed on Oct. 27, 2003.

(51) Int. Cl.
*B29C 45/40* (2006.01)

(52) U.S. Cl. .................. 425/438; 425/556; 425/577

(58) Field of Classification Search ................ 425/438, 425/556, 577, DIG. 58
See application file for complete search history.

(56) References Cited

U.S. PATENT DOCUMENTS

| | | | | |
|---|---|---|---|---|
| 3,642,417 A | 2/1972 | Von Holdt | .................. | 425/443 |
| 3,811,645 A | 5/1974 | Feist | .......................... | 249/68 |
| 3,905,740 A * | 9/1975 | Lovejoy | ..................... | 425/438 |
| 4,854,849 A * | 8/1989 | Sudo | .......................... | 425/556 |
| 5,137,442 A | 8/1992 | Starkey | ...................... | 425/438 |
| 5,219,594 A | 6/1993 | Meyer et al. | ................ | 425/577 |
| 5,281,127 A * | 1/1994 | Ramsey | ....................... | 425/556 |
| 5,316,467 A | 5/1994 | Starkey | ...................... | 425/438 |
| 5,551,864 A | 9/1996 | Boskovic | .................... | 425/556 |
| 5,814,357 A | 9/1998 | Boskovic | .................... | 425/556 |
| 6,039,558 A * | 3/2000 | Park et al. | .................. | 425/556 |
| 6,443,723 B1 | 9/2002 | Buttigieg | .................... | 425/214 |
| 6,491,512 B1 | 12/2002 | Vandenberg | ................ | 425/556 |
| 6,491,513 B1 | 12/2002 | Schneider | .................... | 425/577 |
| 6,537,053 B1 | 3/2003 | Watkins | ....................... | 425/190 |
| 2002/0076466 A1 | 6/2002 | Mowery et al. | ............ | 425/556 |
| 2005/0042322 A1* | 2/2005 | Takao | .......................... | 425/443 |

FOREIGN PATENT DOCUMENTS

| | | | | |
|---|---|---|---|---|
| JP | 407032370 A * | 2/1995 | ................. | 425/556 |
| JP | 410095019 A * | 4/1998 | ................. | 425/556 |
| JP | 01/79898 | 3/2001 | | |
| JP | 01/96590 | 4/2001 | | |

OTHER PUBLICATIONS

English Abstract of JP407032370A and JP410095019A.*

* cited by examiner

*Primary Examiner*—Joseph S. Del Sole
*Assistant Examiner*—Emmanuel S. Luk
(74) *Attorney, Agent, or Firm*—Van Dyke, Gardner, Linn & Burkhart, LLP

(57) ABSTRACT

An ejector assembly for use with a mold for molding plastic parts include a first stationary member, a second stationary member and an ejector plate moveable between the first and second stationary members. A core blade lifter is provided that includes a lifter foot assembly that is moveable with the ejector plate. The core blade lifter includes a lifter rod pivotally mounted to the lifter foot assembly and moveable laterally and longitudinally in response to movement of the ejector plate. A stationary helper pin is provided generally parallel to the lifter rod. The core blade lifter includes a helper carrier pivotally mounted to the lifter foot assembly and moveable along the helper pin.

10 Claims, 9 Drawing Sheets

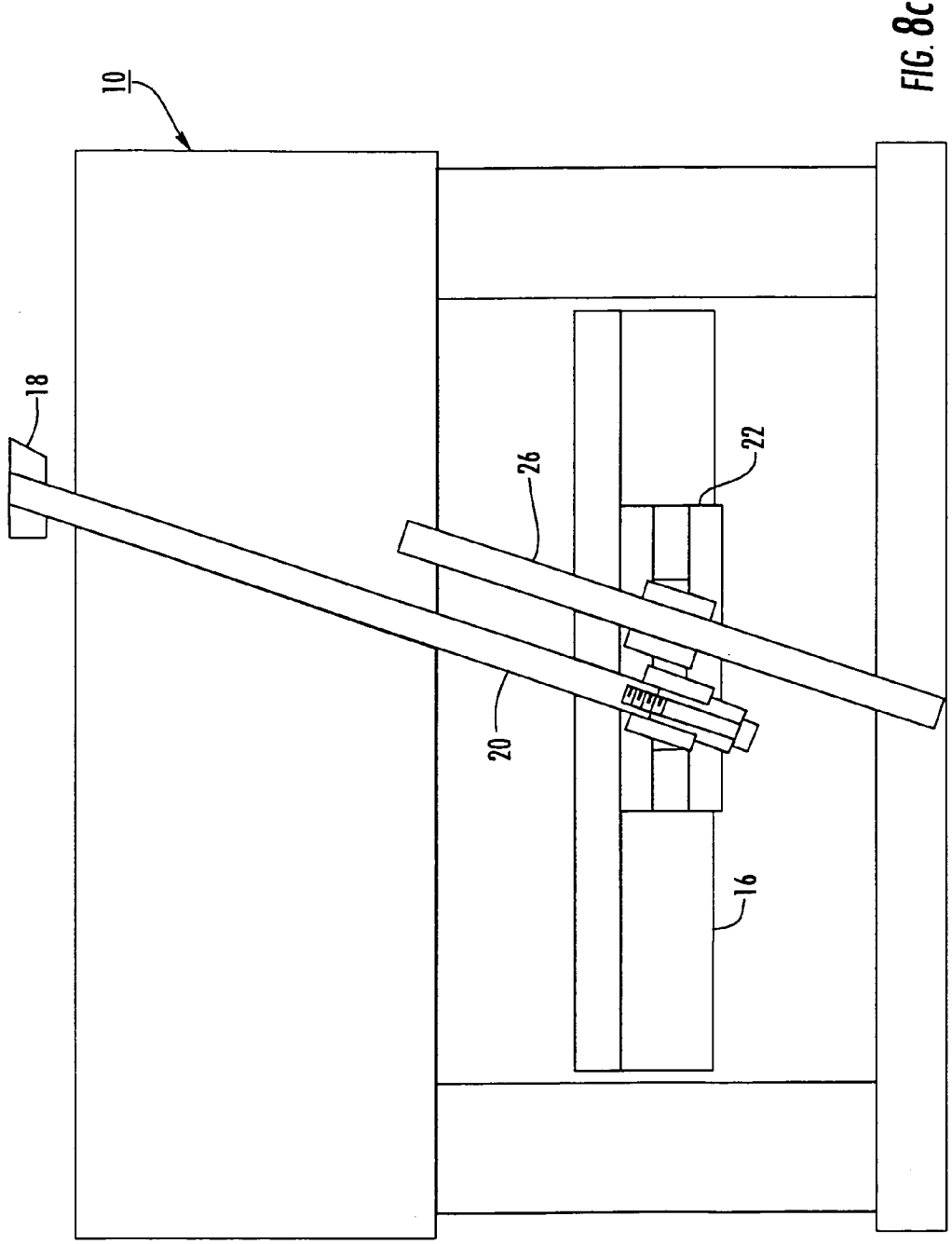

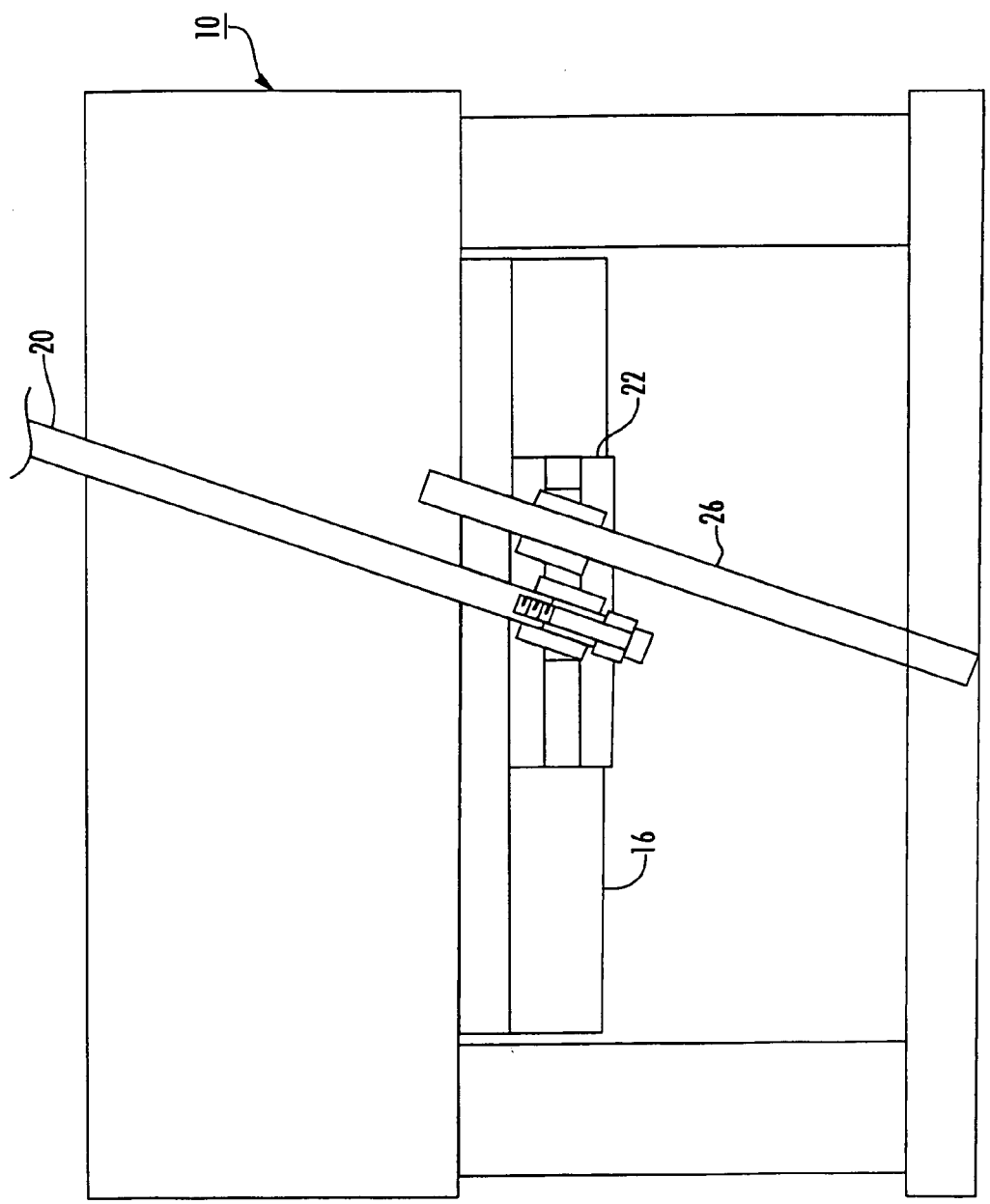

US 7,140,868 B1

UNIVERSAL LIFTER FOOT ASSEMBLY FOR REMOVAL OF CORE BLOCK FROM MOLD

CROSS REFERENCE TO RELATED APPLICATIONS

This application claims priority from U.S. provisional patent application Ser. No. 60/481,567 filed on Oct. 27, 2003, the disclosure of which is hereby incorporated herein by reference in its entirety.

BACKGROUND OF INVENTION

The present invention is directed to an ejector assembly for use with a mold for molding plastic parts and, in particular, to a lifter foot assembly for removal of a core block from the mold.

When molding a plastic part having an undercut feature underneath the part, it is necessary to eject the part from the mold in a compound motion. The motion involves lateral movement as well as movement away from the mold surface. This may be accomplished by a core blade lifter in the form of a lifter rod which is mounted at an angle to the ejector plate by a lifter foot assembly that is capable of traveling laterally along the ejector plate. This allows the ejector plate end of the lifter rod to move laterally as the ejector plate is actuated.

For certain part designs, the amount of undercut requires that the lifter rod be mounted at a more extreme angle with respect to the direction of movement of the ejector plate. Such extreme angle places additional force on the foot assembly which could result in failure or excessive wear to the lifter rod and/or the lifter foot assembly.

Designing an ejector assembly has traditionally been a time-consuming task. The lifter foot assembly has to be machined to accommodate the angle of the lifter rod. Moreover, if it desired to control the acceleration of the lifter rod during the ejection of the part, it is common to provide a slight increase or decrease in elevation up the lifter rod with respect to the ejector plate during the lateral motion of the lifter rod. This also must be calculated and specifically machined into the lifter foot assembly.

SUMMARY OF INVENTION

The present invention provides a universal lifter foot assembly and ejector assembly utilizing a universal lifter foot assembly which may be readily adapted to various applications without the need for custom machining. The universal lifter foot assembly and ejector assembly, according to the invention, is capable of accommodating increased lifter rod angles while reducing wear on the lifter rod and lifter foot assembly. The present invention accommodates the use of a helper pin in a manner which may be universally accommodated for various lifter rod angles and facilitates the crafting of acceleration of the lifter rod for particular applications.

An ejector assembly for use with a mold for molding plastic parts, according to another aspect of the invention, includes a first stationary member, a second stationary member and an ejector plate moveable between the first and second stationary members. A core blade lifter is provided that includes a lifter foot assembly that is moveable with the ejector plate and a lifter rod. The lifter foot assembly includes a rod carrier pivotally mounting the lifter rod to the lifter foot assembly. A stationary helper pin is provided that is generally parallel to the lifter rod. The core blade lifter includes a helper carrier that is pivotally mounted to the lifter foot assembly and is moveable along the helper pin. The lifter foot assembly includes a pair of gib plates with camming surfaces defined along the gib plates. The helper carrier and the rod carrier are commonly slidable along the camming surfaces.

A universal lifter foot assembly for use with an ejector assembly of a mold for molding plastic parts, according to another aspect of the invention, includes a pair of gib plates with camming surfaces defined along the gib plates. A carrier assembly is slidable with respect to the camming surfaces. The carrier assembly includes a rod carrier, a helper carrier and wear plates. The rod carrier and the helper carrier are pivotally mounted by the wear plates. The wear plates engage the camming surfaces. The rod carrier is adapted to actuate a lifter rod. The helper carrier is adapted to slide along a stationary helper pin generally parallel to the lifter rod.

A universal lifter foot assembly for use with an ejector assembly of a mold for molding plastic parts, according to another aspect of the invention, includes a pair of gib plates with camming surfaces defined along the gib plates. A carrier assembly is slidable with respect to the camming surfaces. The carrier assembly includes a rod carrier, a helper carrier and wear plates. The rod carrier and the helper carrier are pivotally mounted by the wear plates. The wear plates engage the camming surfaces. The rod carrier is adapted to actuate a lifter rod. The helper carrier is adapted to slide along a stationary helper pin generally parallel to the lifter rod.

These and other objects, advantages and features of this invention will become apparent upon review of the following specification in conjunction with the drawings.

BRIEF DESCRIPTION OF DRAWINGS

FIGS. 8a–8d are side elevations of an ejector assembly illustrating operation thereof.

DETAILED DESCRIPTION

Figure 1:
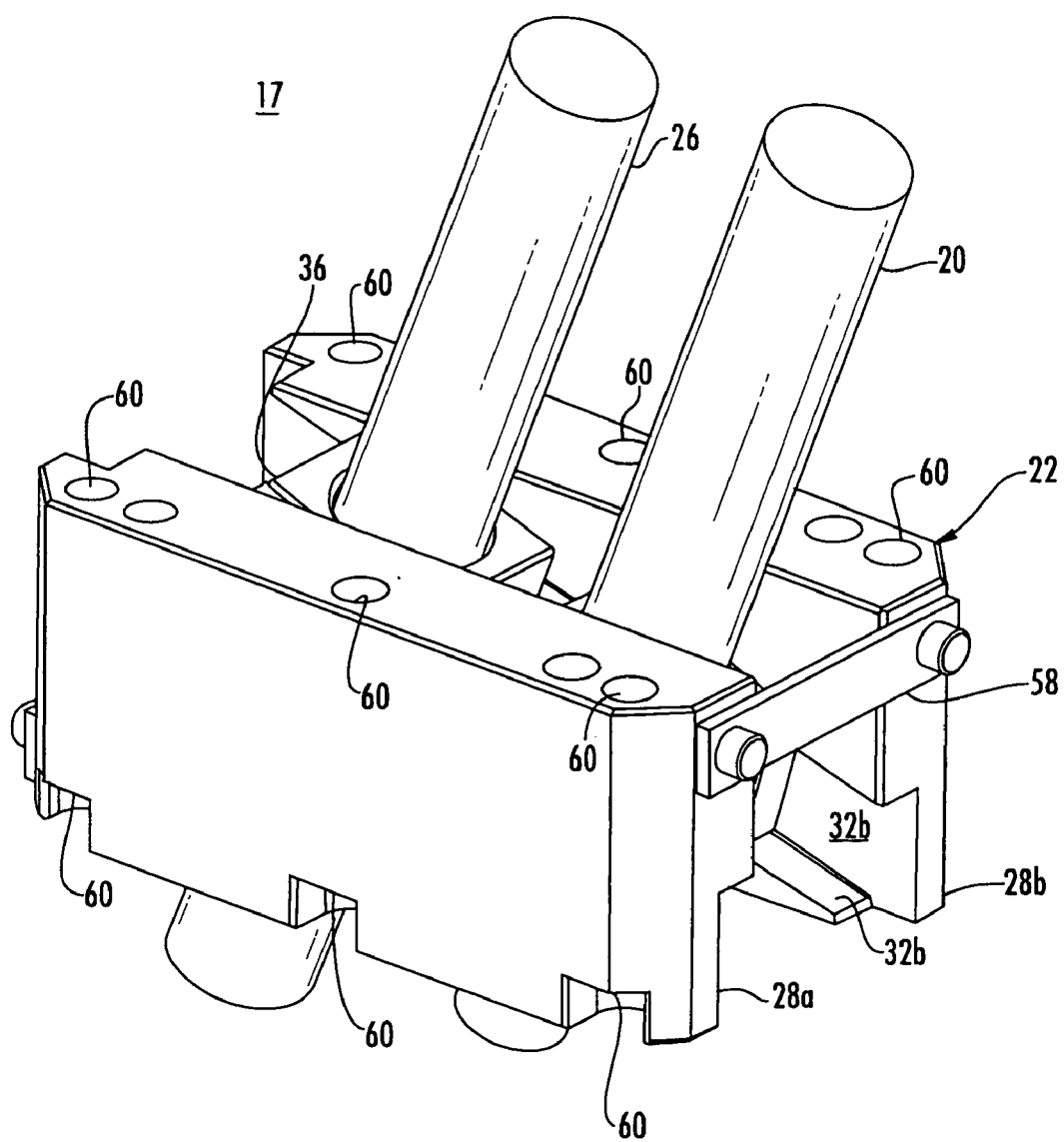
FIG. 1 is a perspective view of a core blade lifter assembly, according to an embodiment of the invention, taken from the top, front, and right side thereof.
Figure 2:
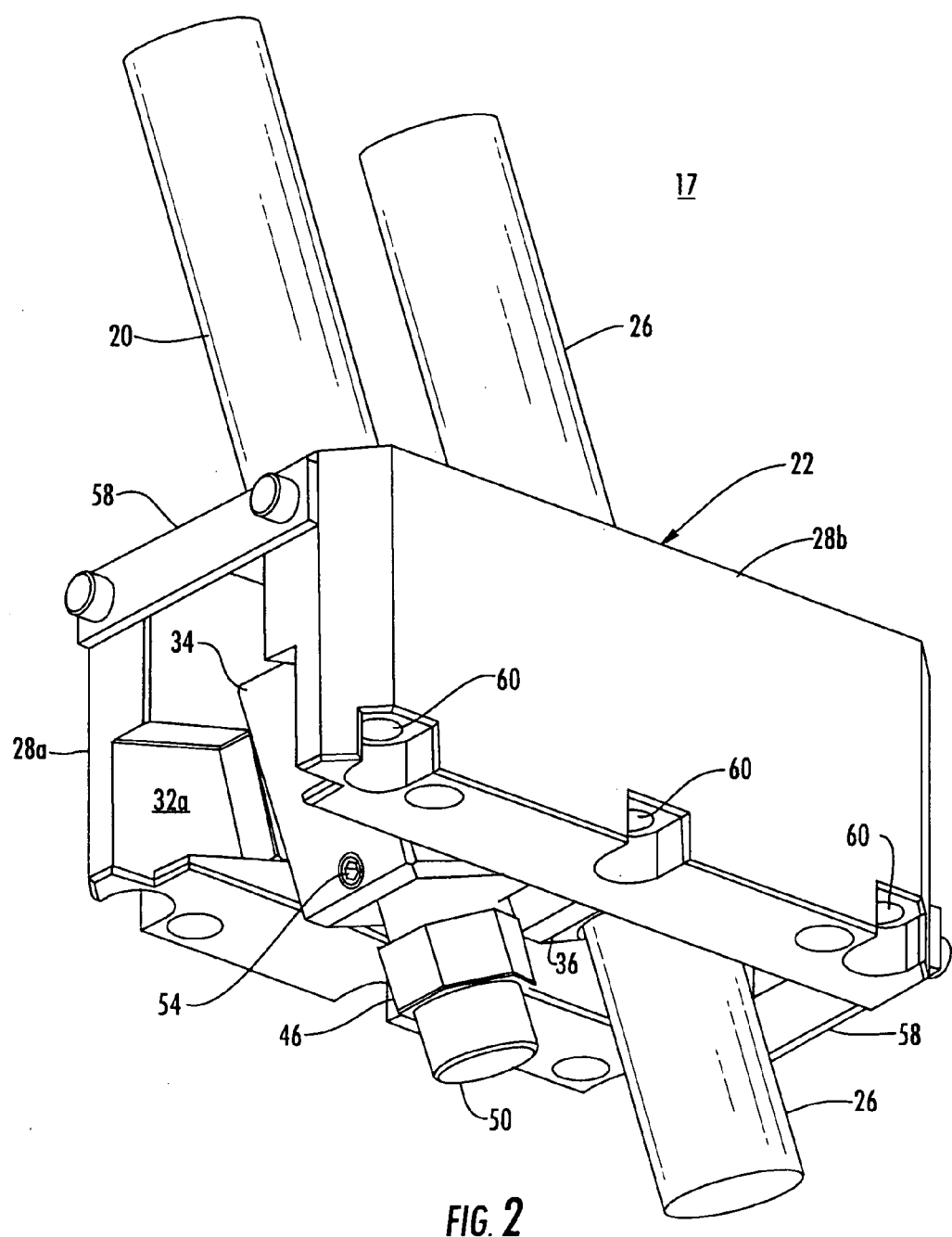
FIG. 2 is a perspective view of the core blade lifter assembly of FIG. 1 taken from a bottom, front, and left side thereof.
Figure 3:
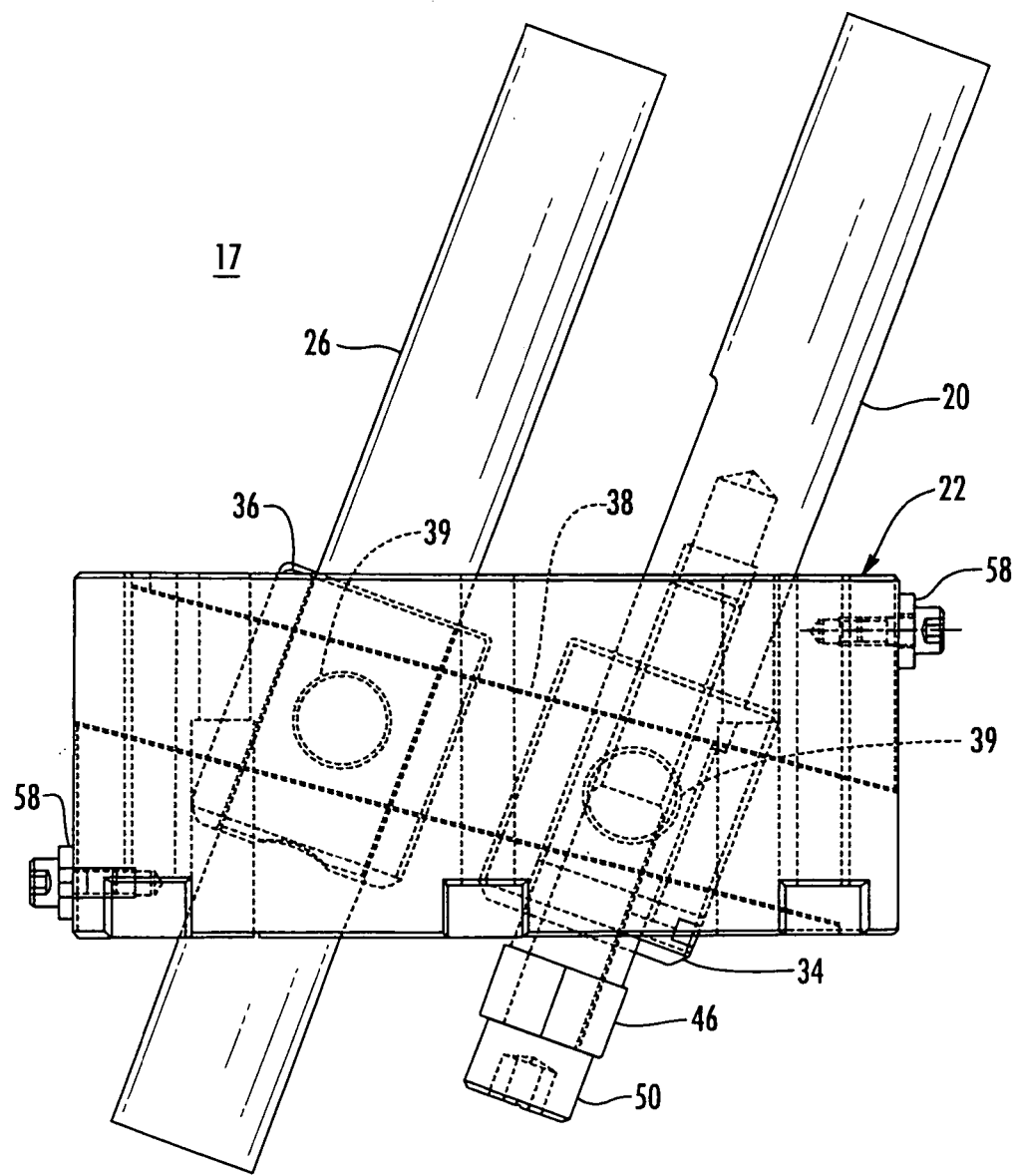
FIG. 3 is a side elevation of the core blade lifter assembly of FIG. 1 taken from the rear thereof.
Figure 4:
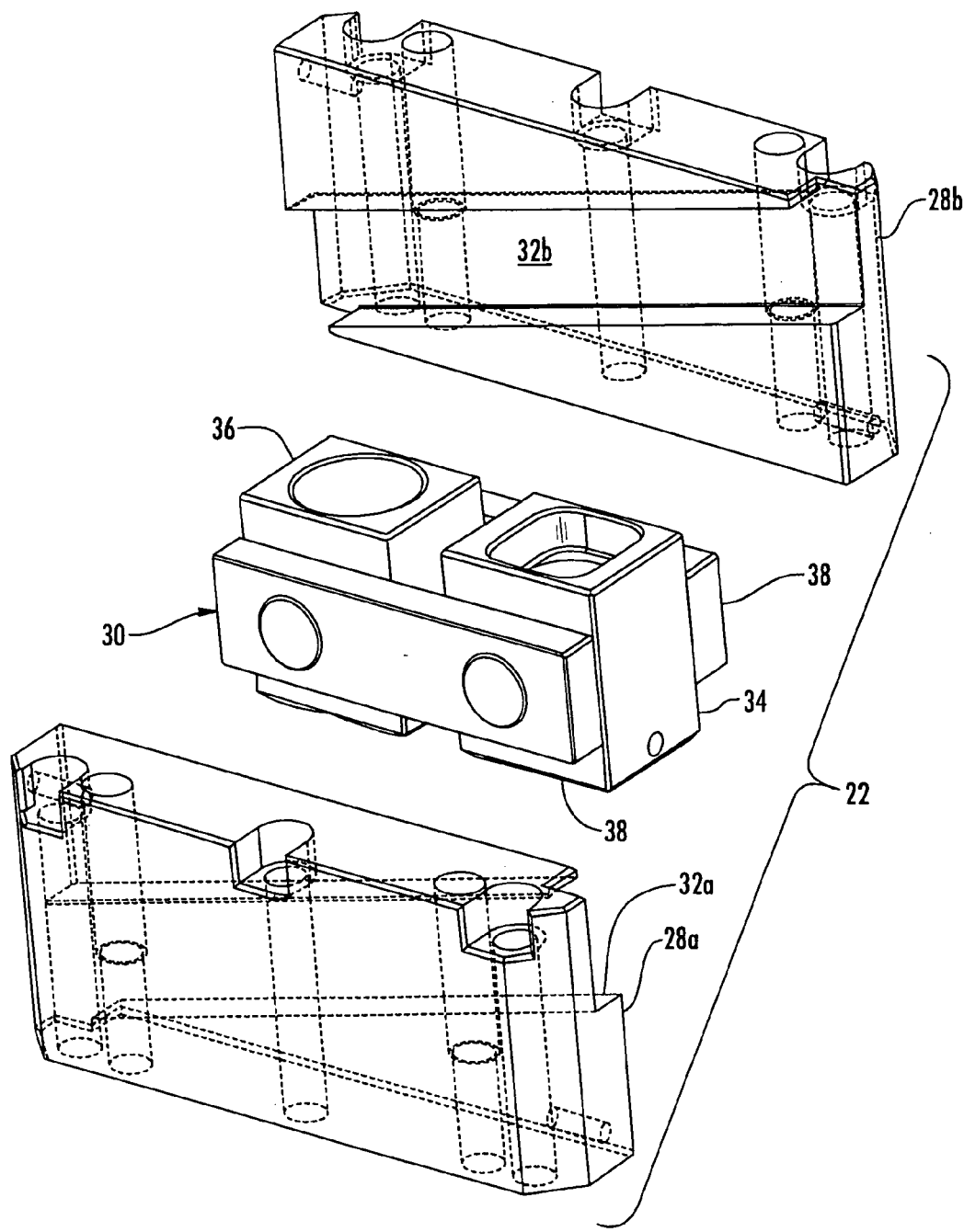
FIG. 4 is an exploded perspective view of a lifter foot assembly, according to an embodiment of the invention.
Figure 5A:
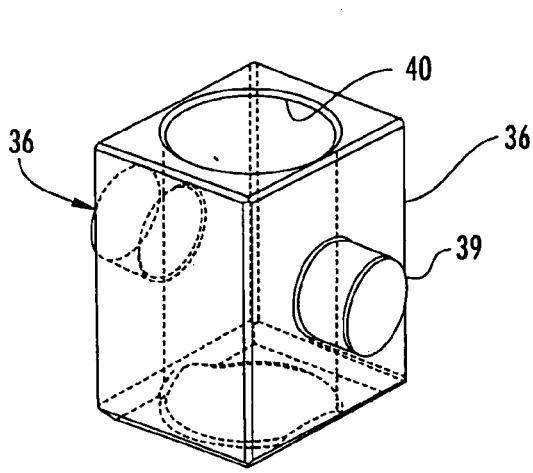
FIGS. 5a and 5b are perspective views of a helper carrier.
Figure 5B:
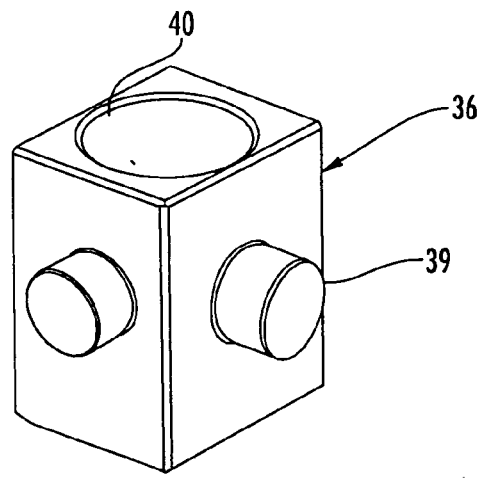
Figure 6A:
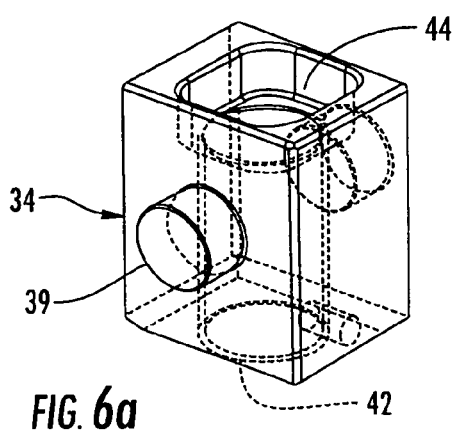
FIGS. 6a and 6b are perspective views of a rod carrier.
Figure 6B:
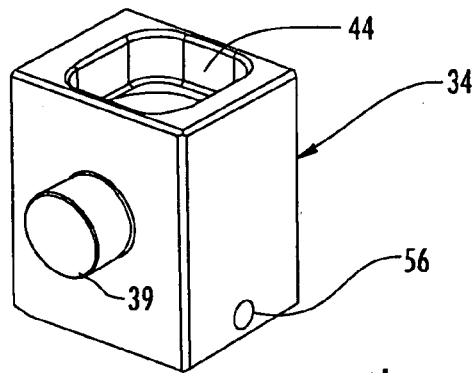
Figure 7A:
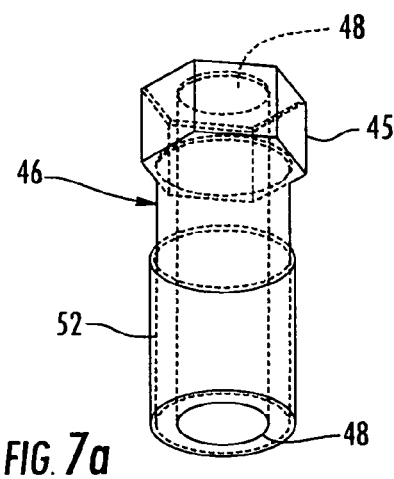
FIGS. 7a and 7b are perspective views of an adjustment screw.
Figure 7B:
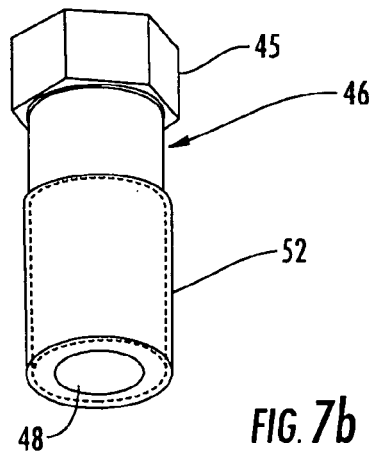

References to up, down, left, right, front, back, and the like, are for relative relational purposes only and should not be considered limiting unless specifically set forth.

Referring now specifically to the drawings, and the illustrative embodiments depicted therein, an ejector assembly 10 includes a top stationary member, or ejector block, 12, a bottom stationary member, or clamp plate, 14 and an ejector plate 16 which is moveable between the clamp plate and the ejector block (FIGS. 8a–8d). In order to eject a part from the mold (not shown), ejector plate 16 moves from a position generally adjacent the clamp plate in a direction of the ejector block. As is known in the art, ejector block 12 typically defines half of the mold, with the remaining portion of the mold defined by another mold half which is not shown.

Lifter foot assembly 22 includes symmetrical mirror image gib plates 28a, 28b and a carrier assembly 30 which is slidable along camming surfaces 32a, 32b defined in respective gib plates 28a, 28b (FIGS. 1–4). Carrier assembly 30 includes a rod carrier 34 that is adapted to engage and actuate lifter rod 20. Carrier assembly 30 additionally includes a helper carrier 36 which captures and slides along upper pin 26. Both rod carrier 34 and helper carrier 36 are pivotal with respect to gib plates 28a, 28b. This may be accomplished by a pair of wear plates 38 which pivotally support the rod carrier and the helper carrier and which slidably engage camming surfaces 32. Wear plates 38 include openings which rotatably support hubs 39 extending from rod carrier 34 and helper carrier 36. In the illustrative embodiment, gib plates 28a, 28b, rod carrier 34 and helper carrier 36 are made from steel and wear plates 38 are made from a self-lubricating material, such as bronze. However, other combinations of materials may be utilized as would be apparent to those skilled in the art.

Helper carrier 36 includes a through opening 40, which is sized to slide along helper pin 26. Rod carrier 34 includes a through opening 42, which receives an end of lifter rod 20. An opposite end of through opening 42 is enlarged at 44 to receive an enlarged gripping portion 45 of an adjustment screw 46. Adjustment screw 46 includes a through opening 48 to receive a fastener 50, which passes through the adjustment screw and into a threaded end of lifter rod 20. An external surface 52 of adjustment screw 46 is threaded to mate with an internally threaded surface of through opening 42. This allows adjustment screw 46 to be threadably adjustable with respect to rod carrier 34. This allows the rod carrier relationship to the lifter foot assembly to be adjusted by manipulation of gripping portion 45, such as with a wrench. A setscrew 54 positioned in an opening 56 in rod carrier 34 captures the adjustment screw 46 to prevent it from being removed from the rod carrier. A pair of end plates 58 retains the appropriate spacing of the gib plates and captures the carrier assembly in camming surfaces 32 to prevent separation therefrom. Mounting openings 60, which extend the full height of the respective gib plates, provide for mounting of the lifter foot assembly to the ejector plate.

In operation, helper pin 26 is fixed to ejector block 12 and clamp plate 14 at the same angle as lifter rod 20. Because rod carrier 34 and helper carrier 36 are pivotally mounted with respect to the gib plates, lifter foot assembly 22 may be utilized with various angular orientations of the lifter rod and helper pin. In the illustrative embodiment, the lifter rod and helper pin may be positioned at an angle of 0 to 15 degrees with respect to the direction of movement of the ejector plate and may even be utilized at an angle of up to approximately 20 degrees with respect to the direction of movement of the ejector plate. As the ejector plate actuates lifter rod 20 upwardly, helper carrier 36 slides along helper pin 26. Also, as the ejector plate 16 moves, the carrier assembly 30 moves laterally. This is assisted by the helper pin which assists in causing the slidable motion of the carrier assembly thereby reducing the lateral force placed upon the lifter rod.

In operation, helper pin 26 is fixed to ejector block 12 and clamp plate 14 at the same angle as lifter rod 20. Because rod carrier 34 and helper carrier 36 are pivotally mounted with respect to the gib plates, lifter foot assembly 22 may be utilized with various angular orientations of the lifter rod and helper pin. In the illustrative embodiment, the lifter rod and helper pin may be positioned at an angle of 0 to 15 degrees with respect to the direction of movement of the ejector plate and may even be utilized at an angle of up to approximately 20 degrees with respect to the direction of movement of the ejector plate. As the ejector plate actuates lifter rod 20 upwardly, helper carrier 36 slides along helper pin 26. Also, as the ejector plate 16 moves, the carrier assembly 30 moves laterally. This is assisted by the helper pin which assists in causing the slidable motion of the carrier assembly thereby reducing the lateral force placed upon the lifter rod.

Figure 8A:
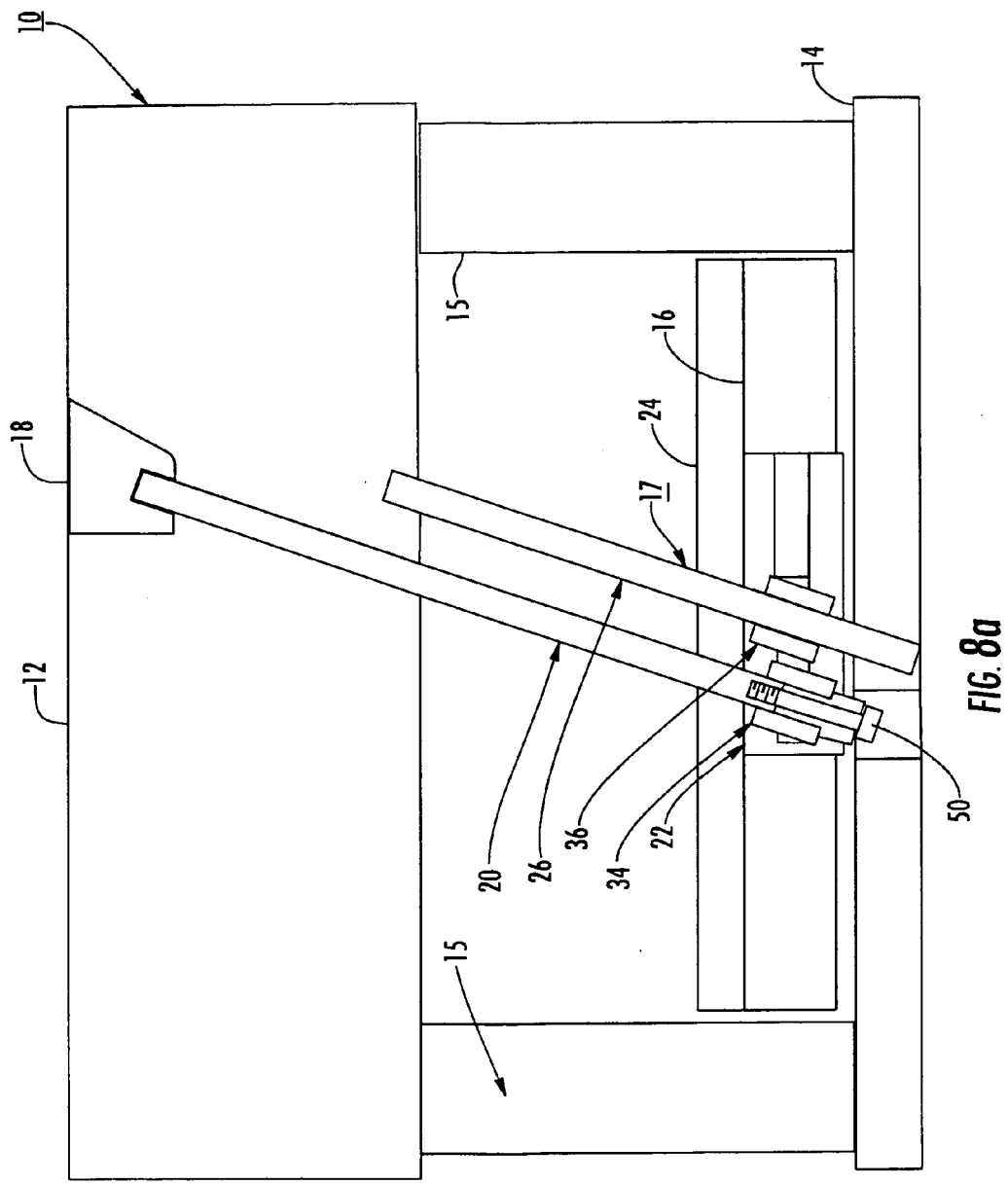
Figure 8B:
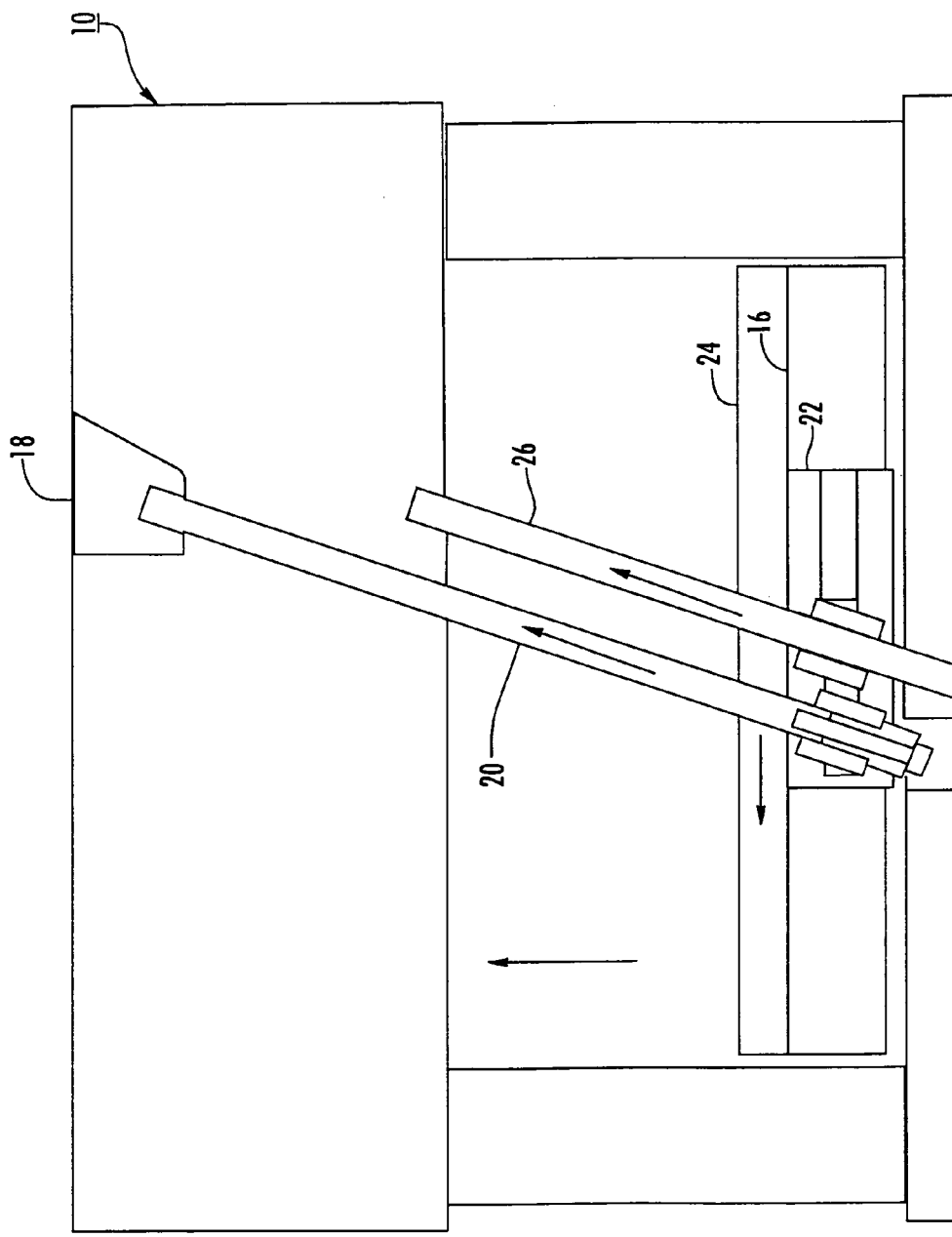

Referring now to the illustration in FIGS. 8a–8d, upon completion of the molding operation, the ejector plate is spaced apart from the ejector block, as illustrated in FIG. 8a. The ejector plate begins moving away from the clamp plate and toward the ejector plate, as illustrated in FIG. 8d, in the direction of ejector plate travel. This places a force on the carrier assembly which would, otherwise, cause a force F to be placed on the carrier rod and lifter foot assembly without the presence of the helper carrier. As illustrated in FIG. 8c, the ejector plate continues to move in the direction of the ejector block, thereby ejecting the part with lift body 18. The ejection is complete in FIG. 8d. The ejector plate then returns to its initial position, as illustrated in FIGS. 8a and 8b.

Thus, it is seen that the present invention provides a universal lifter foot assembly that is exceptionally versatile and allows the mold designer to utilize common components without the necessity for detailed design of the elements thereof. Moreover, a carrier assembly and gib plates may be kept in stock with the angle of the camming surfaces either machined at the time of use or stocked at various angles of inclination. Other modifications will become apparent to those skilled in the art.

Thus, it is seen that the present invention provides a universal lifter foot assembly that is exceptionally versatile and allows the mold designer to utilize common components without the necessity for detailed design of the elements thereof. Moreover, a carrier assembly and gib plates may be kept in stock with the angle of the camming surfaces either machined at the time of use or stocked at various angles of inclination. Other modifications will become apparent to those skilled in the art.

Changes and modifications in the specifically described embodiments can be carried out without departing from the principles of the invention which is intended to be limited only by the scope of the appended claims, as interpreted according to the principles of patent law including the doctrine of equivalents.

The invention claimed is:

1. An ejector assembly for use with a mold for molding plastic parts, said ejector assembly comprising:
   a first stationary member and a second stationary member;
   an ejector plate moveable between said first and second stationary members;
   a core blade lifter including a lifter foot assembly that is moveable with said ejector plate, said core blade lifter including a lifter rod, said lifter foot assembly including a rod carrier pivotally mounting said lifter rod to said lifter foot assembly;
   a stationary helper pin generally parallel to said lifter rod, wherein said core blade lifter includes a helper carrier pivotally mounted to said lifter foot assembly and moveable along said helper pin;
   said lifter foot assembly includes a pair of gib plates with camming surfaces defined along said gib plates, wherein said helper carrier and said rod carrier are commonly slidable along said camming surfaces, wherein said camming surfaces are inclined with respect to said ejector plate.

2. The ejector assembly of claim 1 wherein said helper carrier and said rod carrier are pivotally joined with at least two wear plates and wherein said wear plates are slidable along said camming surfaces.

3. The ejector assembly of claim 1 wherein said camming surfaces are inclined at an angle of at least approximately 15 degrees.

4. The ejector assembly of claim 3 wherein said camming surfaces are inclined at an angle in the range of from approximately 15 degrees to approximately 30 degrees.

5. The ejector assembly of claim 1 including an adjustment device for adjusting extension of said lifter rod with respect to said lifter foot assembly.

6. A universal lifter foot assembly for use with an ejector assembly of a mold for molding plastic parts, said universal lifter foot assembly comprising:
- a pair of removable gib plates with camming surfaces defined along said gib plates;
- a carrier assembly slidable with respect to said camming surfaces; and
- said carrier assembly including a rod carrier, a helper carrier and wear plates, said rod carrier and said helper carrier pivotally mounted by said wear plates, wherein said wear plates engage said camming surfaces;

wherein said rod carrier is adapted to actuate a lifter rod, said helper carrier is adapted to slide along a stationary helper pin generally parallel to the lifter rod, wherein said gib plates are interchangeable with other said gib plates to change an angle of inclination of said camming surfaces.

7. The universal lifter foot assembly of claim 6 wherein said camming surfaces are inclined with respect to said ejector plate.

8. The universal lifter foot assembly of claim 7 wherein said camming surfaces are inclined at an angle of at least approximately 15 degrees.

9. The universal lifter foot assembly of claim 8 wherein said camming surfaces are inclined at an angle in the range of from approximately 15 degrees to approximately 30 degrees.

10. The universal lifter foot assembly of claim 6 wherein said rod carrier includes an adjustment device for adjusting extension of the lifter rod with respect to said universal lifter foot assembly.

\* \* \* \* \*

UNITED STATES PATENT AND TRADEMARK OFFICE
CERTIFICATE OF CORRECTION

| | | |
|---|---|---|
| PATENT NO. | : 7,140,868 B2 | Page 1 of 3 |
| APPLICATION NO. | : 10/708770 | |
| DATED | : November 28, 2006 | |
| INVENTOR(S) | : Harold W. Steele and Phillip A. Tanis | |

It is certified that error appears in the above-identified patent and that said Letters Patent is hereby corrected as shown below:

Abstract (57):
Line 2, "include" should be --includes--.

Column 2:
Lines 19-30, Delete duplicate paragraph "A universal lifter foot assembly for use with an ejector assembly of a mold for molding plastic parts, according to another aspect of the invention, includes a pair of gibb plates with camming surfaces defined along the gibb plates. A carrier assembly is slidable with respect to the camming surfaces. The carrier assembly includes a rod carrier, a helper carrier and wear plates. The rod carrier and the helper carrier are pivotally mounted by the wear plates. The wear plates engage the camming surfaces. The rod carrier is adapted to actuate a lifter rod. The helper carrier is adapted to slide along a stationary helper pin generally parallel to the lifter rod."

Column 3:
Line 4, Insert missing paragraph --A core blade lifter assembly 17 includes a lifter body 18 that is lifted vertically and horizontally by a lifter rod 20 in order to eject a molded plastic part having an undercut portion from the mold, as is known in the art. Core blade lifter assembly 17 includes a lifter foot assembly 22 supported by ejector plate 16 that translates vertical movement of the ejector plate to a combination of vertical and horizontal movement of lifter body 18. Lifter foot assembly 22 may be mounted beneath the ejector plate in the orientation illustrated in Fig. 1, but may, alternatively, be mounted to the top of the ejector plate. A retainer plate 24 may be utilized to assist in retaining the lifter foot assembly to the ejector plate, if necessary. Core blade lifter assembly 17 further includes helper pin 26 that is mounted parallel to lifter rod 20 and is held stationary, such as being secured at respective ends by clamp plate 24 and ejector block 12.-- before "Lifter".

Lines 62-67, Delete duplicate paragraph "In operation, helper pin 26 is fixed to ejector block 12 and clamp plate 14 at the same angle as lifter rod 20. Because rod carrier 34 and helper carrier 36 are pivotally mounted with respect to the gibb plates, lifter foot assembly 22 may be utilized with various angular orientations of the lifter rod and helper pin. In the illustrative embodiment, the lifter rod".

UNITED STATES PATENT AND TRADEMARK OFFICE
CERTIFICATE OF CORRECTION

| | |
|---|---|
| PATENT NO. | : 7,140,868 B2 |
| APPLICATION NO. | : 10/708770 |
| DATED | : November 28, 2006 |
| INVENTOR(S) | : Harold W. Steele and Phillip A. Tanis |

It is certified that error appears in the above-identified patent and that said Letters Patent is hereby corrected as shown below:

<u>Column 4:</u>
Lines 1-11, Delete duplicate paragraph "and helper pin may be positioned at an angle of 0 to 15 degrees with respect to the direction of movement of the ejector plate and may even be utilized at an angle of up to approximately 20 degrees with respect to the direction of movement of the ejector plate. As the ejector plate actuates lifter rod 20 upwardly, helper carrier 36 slides along helper pin 26. Also, as the ejector plate 16 moves, the carrier assembly 30 moves laterally. This is assisted by the helper pin which assists in causing the slidable motion of the carrier assembly thereby reducing the lateral force placed upon the lifter rod."

Line 26, Insert missing paragraph --The present invention may be utilized with a camming surface 32 that is substantially horizontal. Alternatively, the camming surface may be placed at an angle with respect to the surface of the ejector plate as shown in the illustrated embodiment. This allows the designer to apply additional acceleration to the lifter rod or reduce the acceleration of the lifter rod depending upon the angle and the direction of slope of the camming surfaces. In the illustrative embodiment, camming surfaces 32 may typically be at an angle of between 0 and 15 degrees, but may be at an angle of up to 20 and even 30 degrees in order to provide additional acceleration to the lifter rod or reduce acceleration of the lifter rod, if needed. This further facilitates the broad use of the core blade lifter assembly in various applications.--.

UNITED STATES PATENT AND TRADEMARK OFFICE
CERTIFICATE OF CORRECTION

| | | |
|---|---|---|
| PATENT NO. | : 7,140,868 B2 | |
| APPLICATION NO. | : 10/708770 | |
| DATED | : November 28, 2006 | |
| INVENTOR(S) | : Harold W. Steele and Phillip A. Tanis | |

It is certified that error appears in the above-identified patent and that said Letters Patent is hereby corrected as shown below:

Column 4 (cont.):
Lines 35-43, Delete duplicate paragraph --Thus, it is seen that the present invention provides a universal lifter foot assembly that is exceptionally versatile and allows the mold designer to utilize common components without the necessity for detailed design of the elements thereof. Moreover, a carrier assembly and gibb plates may be kept in stock with the angle of the camming surfaces either machined at the time of use or stocked at various angles of inclination. Other Other modifications will become apparent to those skilled in the art.--

Signed and Sealed this

Eighteenth Day of September, 2007

JON W. DUDAS
*Director of the United States Patent and Trademark Office*